(12) United States Patent
Nakagawa

(10) Patent No.: US 11,738,572 B2
(45) Date of Patent: Aug. 29, 2023

(54) IMAGE RECORDING APPARATUS

(71) Applicant: BROTHER KOGYO KABUSHIKI KAISHA, Nagoya (JP)

(72) Inventor: Shinya Nakagawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/725,614

(22) Filed: Apr. 21, 2022

(65) Prior Publication Data

US 2022/0339948 A1    Oct. 27, 2022

(30) Foreign Application Priority Data

Apr. 26, 2021 (JP) ................. 2021-074273

(51) Int. Cl.
*B41J 11/00* (2006.01)
*G01C 3/02* (2006.01)

(52) U.S. Cl.
CPC ........ *B41J 11/00212* (2021.01); *B41J 11/002* (2013.01); *G01C 3/02* (2013.01)

(58) Field of Classification Search
CPC ................ B41J 11/00212; B41J 11/002; B41J 11/00214; B41J 11/00218; G01C 3/02
See application file for complete search history.

(56) References Cited

U.S. PATENT DOCUMENTS

2016/0080611 A1* 3/2016 Yorimoto ................. H04N 1/04
358/509

FOREIGN PATENT DOCUMENTS

JP    2018-069664 A    5/2018

* cited by examiner

*Primary Examiner* — Bradley W Thies
(74) *Attorney, Agent, or Firm* — Scully, Scott, Murphy & Presser, PC

(57) ABSTRACT

There is provided an image recording apparatus including: head configured to discharge a photo-curing liquid to a medium; irradiator configured to irradiate a curing light to cure the photo-curing liquid; distance measurer including first light emitter configured to emit a ranging light to measure a distance to the medium, and first light receiver configured to receive the ranging light; and casing housing the head, the irradiator and the distance measurer, and having a window through which an inside of the casing is visually perceptible. First filter is provided on the window, the first filter having a function of restraining transmission of the curing light more compared to transmission of a visible light. Second filter is provided on the first light receiver, the second filter having a function of restraining transmission of the visible light more compared to transmission of the ranging light.

10 Claims, 5 Drawing Sheets

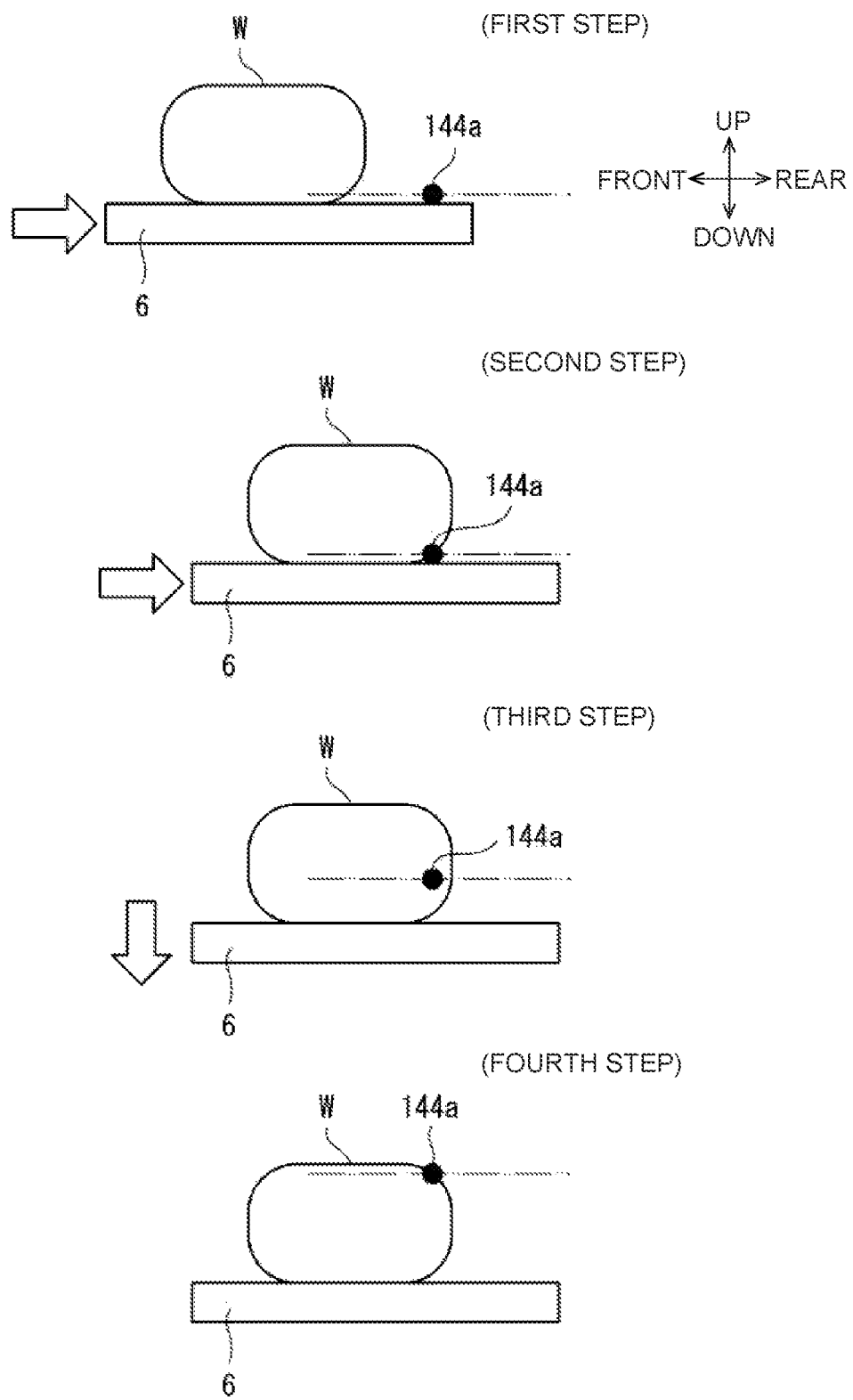

IMAGE RECORDING APPARATUS

CROSS REFERENCE TO RELATED APPLICATIONS

The present application claims priority from Japanese Patent Application No. 2021-074273, filed on Apr. 26, 2021, the disclosure of which is incorporated herein by reference in its entirety.

BACKGROUND

The present disclosure relates to an image recording apparatus such as, for example, an ink jet printer and the like.

Conventionally, there are known printing apparatuses which print images by discharging (ejecting) an ultraviolet curing ink on the surface of a cubic object in a three dimension shape. Such a printing apparatus includes a configuration for detecting the height of a printing object placed on a table. In particular, this printing apparatus includes an ascending/descending mechanism to move the table upward and downward, a movable plate member in contact with the printing object ascended together with the table, and an optical sensor such as a photo micro sensor or the like to detect the displacement of the plate member.

By virtue of this, if the table on which the printing object is placed is caused to ascend and then the table is ascended on after the printing object is in contact with the plate member, then it is possible to determine that the printing object has reached to a predetermined height with the optical sensor detecting the displacement of the plate member. Further, the printing apparatus includes a case housing the abovementioned table and the like, and a front cover provided to be openable and closeable to an opening of the case and, in the front cover, a window is provided to allow for visual perception of the printing condition in the case.

SUMMARY

An image recording apparatus according to an aspect of the present disclosure includes a head, an irradiator, a distance measurer, and a casing.

The head is configured to discharge a photo-curing liquid to a medium.

The irradiator is configured to irradiate a curing light to cure the photo-curing liquid.

The distance measurer includes a first light emitter configured to emit a ranging light to measure a distance to the medium, and a first light receiver configured to receive the ranging light.

The casing houses the head, the irradiator and the distance measurer, and has a window through which an inside of the casing is visually perceptible.

A first filter is provided on the window, the first filter having a function of restraining transmission of the curing light more compared to transmission of a visible light.

A second filter is provided on the first light receiver, the second filter having a function of restraining transmission of the visible light more compared to transmission of the ranging light.

According to such a configuration as set forth above, because the first filter restrains the curing light from transmission, it is possible to prevent or suppress the curing light from leaking out from the window. Further, even if visible light comes into the casing, because the second filter restrains the visible light from transmission, it is still possible to prevent or suppress the visible light from entering the first light receiver as a disturbance, thereby allowing for facilitation of improving ranging precision.

BRIEF DESCRIPTION OF THE DRAWINGS

FIG. 5 is a schematic diagram for explaining a correction process.

DETAILED DESCRIPTION

In the case of the above printing apparatus, light comes into the case through the window from the outside. Thus, because the printing apparatus detects the displacement of the plate member on the basis of the light receiving amount detected by the optical sensor, the detection precision may be affected by the incoming visible light as a disturbance. Further, the ultraviolet rays irradiated to cure the ink may leak out from the window.

The present disclosure is made for solving such problems, and an object thereof is to provide an image recording apparatus capable of improving the detection precision of the optical sensor, and preventing or reducing the ultraviolet rays for curing the ink from leaking out of the apparatus.

According to the present disclosure, it is possible to provide an image recording apparatus capable of improving the detection precision of the optical sensor and preventing or reducing the ultraviolet rays for curing the ink from leaking out of the apparatus.

Hereinbelow, referring to the accompanied drawings, an explanation will be made on an image recording apparatus according to an embodiment of the present disclosure.

Note that the image recording apparatus in the following explanation is merely one embodiment of the present disclosure. Therefore, the present invention is not limited to the following embodiment but can undergo addition, deletion and modification without departing from the spirit of the present invention.

<Exterior Configuration>

Figure 1:
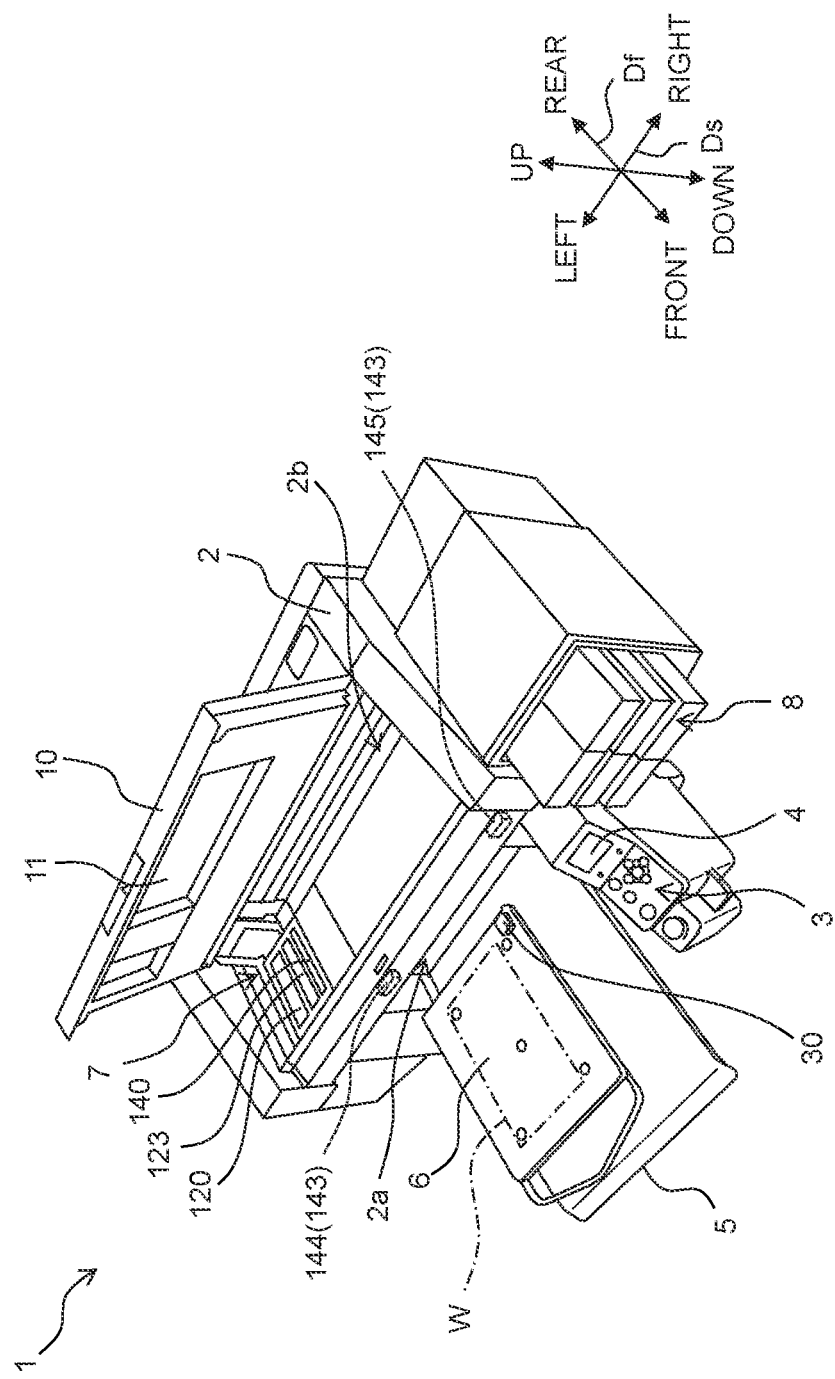
FIG. 1 is a perspective view depicting an image recording apparatus.

FIG. 1 is a perspective view depicting an image recording apparatus 1 according to the embodiment. The concept of direction in this specification refers the mutually orthogonal directions depicted in FIG. 1 to the up/down direction, the left/right direction, and the front/rear direction. Further, the left/right direction is the main scanning direction Ds whereas the front/rear direction is the sub scanning direction Df (corresponding to a conveyance direction for a discharging object medium W) which is a direction orthogonal to the main scanning direction Ds.

As depicted in FIG. 1, an image recording apparatus 1 of this embodiment includes a casing 2, an operation keys 3, a display 4, a tray 5, a stage 6, a carriage 7, and ink tanks 8.

In these members, the casing 2 is shaped into a box, for example, having a front opening 2a in its front side for supplying the discharging object medium (medium) W to the inside of the casing 2 and having an openable and closeable upper cover 10 in its upper side. The upper cover 10 can be opened by swinging the same upward with the rear end as the base point. If the upper cover 10 is opened, then the inside of the casing 2 is exposed through an upper opening 2b of the casing 2. Further, the upper cover 10 is provided with a window 11 through which the inside of the casing 2 is visually perceived. That is, even if the upper cover 10 is closed, it is still possible for a user to visually perceive the inside of the casing 2 through the window 11. The casing 2 of such kind houses (accommodates) a discharging head 121, a curing device (irradiator) 123, a ranging devise (distance measurer) 140, and the like which will all be described later on.

The operation keys 3 are provided at the right-front part of the casing 2, accepting the user's operating inputs. The display 4 is provided at the rear side of the operation keys 3 to display predetermined information. Further, if the display 4 is constructed of a touch panel, then the display 4 can display the information as well as accept the user's operating inputs.

The tray 5 is provided in front of the front opening 2a of the casing 2, and the stage 6 is provided above the tray 5 to serve as the support configured to support the discharging object medium (medium) W. The tray 5 supports the stage 6 from below, and is movable together with the stage 6 in the front/rear direction, between a front position in front of the front opening 2a and a position entered into the casing 2 via the front opening 2a. The stage 6 is plate-shaped and, is movable with respect to the discharging head 121 in the up/down direction by an approaching/separating device (shifter) 133 (see FIG. 2), in a state that the discharging object medium W is supported on the stage 6.

The carriage 7 is provided below the upper opening 2b in the casing 2. The carriage 7 is configured to reciprocate along the main scanning direction Ds by a scanning device (scanner) 130 (see FIG. 2). A discharging device 120, the curing device (irradiator) 123, and the ranging device (distance measurer) 140 are mounted on the carriage 7 in this order from the left. The discharging device 120 discharges an ultraviolet curing ink in each color such as cyan (C), magenta (M), yellow (Y), black (K), white (W), transparent, or the like. The curing device 123 irradiates ultraviolet rays toward the ink landed on the discharging object medium W. Further, the ranging device 140 measures the distance from the ranging device 140 to the object arranged opposed to (facing) the ranging device 140. Details of those respective devices will be described later on.

The ink tanks 8 individually stores the ultraviolet curing ink in different colors mentioned above. Each of the ink tanks 8 is connected to the discharging device 120 through an ink tube to supply the discharging device 120 with the ink of each color.

<Functional Configuration>

Figure 2:
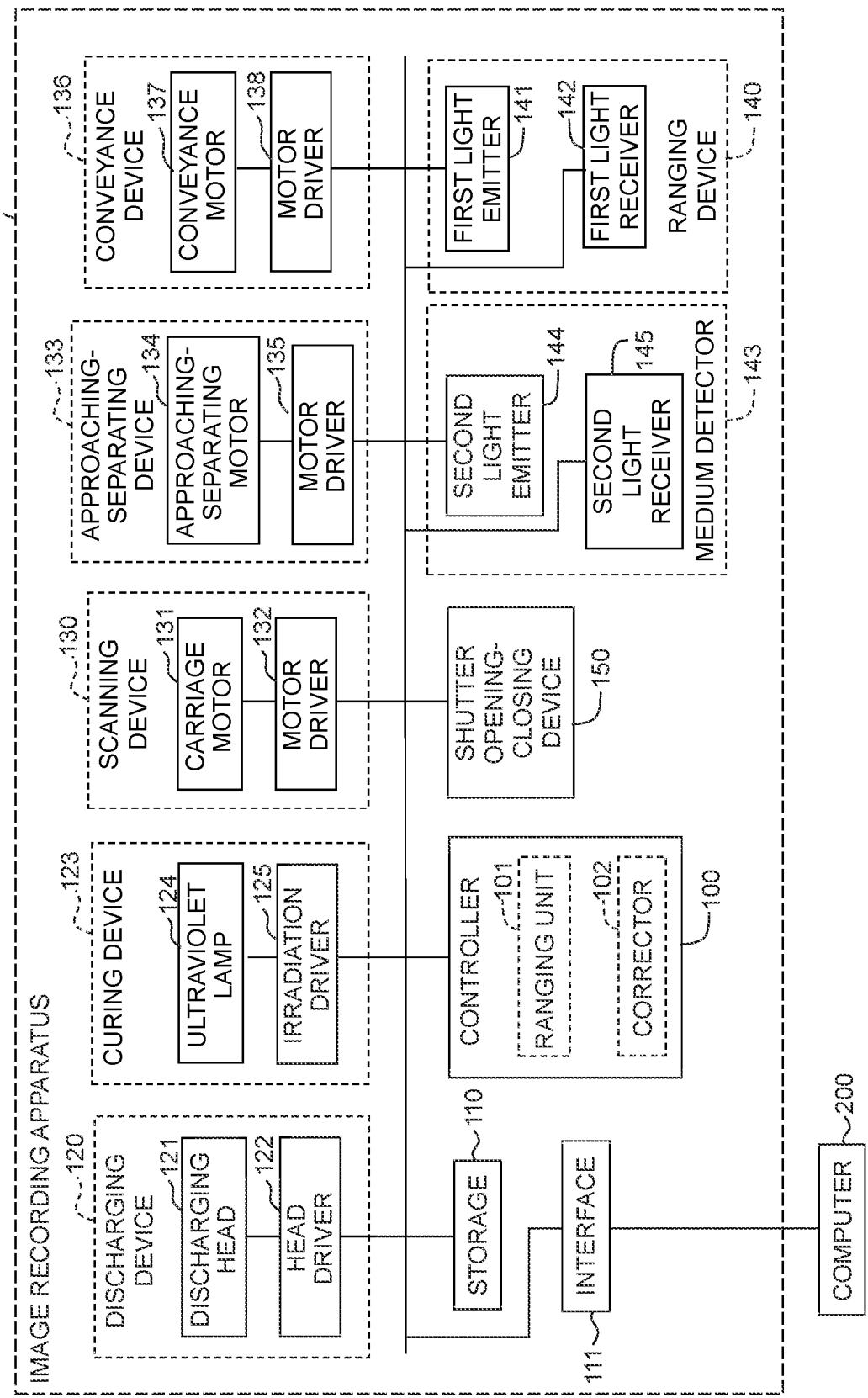
FIG. 2 is a block diagram of the image recording apparatus.

FIG. 2 is a block diagram of the image recording apparatus. As depicted in FIG. 2, the image recording apparatus 1 includes a controller 100 corresponding to a computer having an MPU, a RAM, a ROM, and the like, and a storage 110 constructed of a flash memory or a hard disk or the like. Then, the controller 100 controls the operation of each device included in the image recording apparatus 1 on the basis of a control program stored in the storage 110. The image recording apparatus 1 includes, as those devices, the discharging device 120, the curing device (irradiator) 123, the scanning device (scanner) 130, the approaching/separating device (shifter) 133, a conveyance device (conveyer) 136, the ranging device (distance measurer) 140, a medium detector 143, and the like.

The discharging device 120 includes the discharging head 121 and a head driver 122. The discharging head 121 is configured to discharge the ultraviolet curing ink (to be referred to below simply as "ink"), which is an example of a photo-curing liquid, toward the discharging object medium W (that is, toward the direction of the stage 6). The discharging head 121 has a lower surface (nozzle surface) where a plurality of nozzles is provided dedicatedly for the ink in each color. An actuator driven electrically is provided inside the discharging head 121 for each nozzle. The head driver 122 is made of an IC chip or the like to operate under a control signal from the controller 100 to drive the actuator for each nozzle. The actuator is driven by the electric power supplied from the head driver 122 so as to apply a discharge pressure to the ink supplied to the discharging head 121 from the ink tanks 8 such that the ink to which the pressure is applied is discharged from the nozzles onto the discharging object medium W.

Figure 3A:
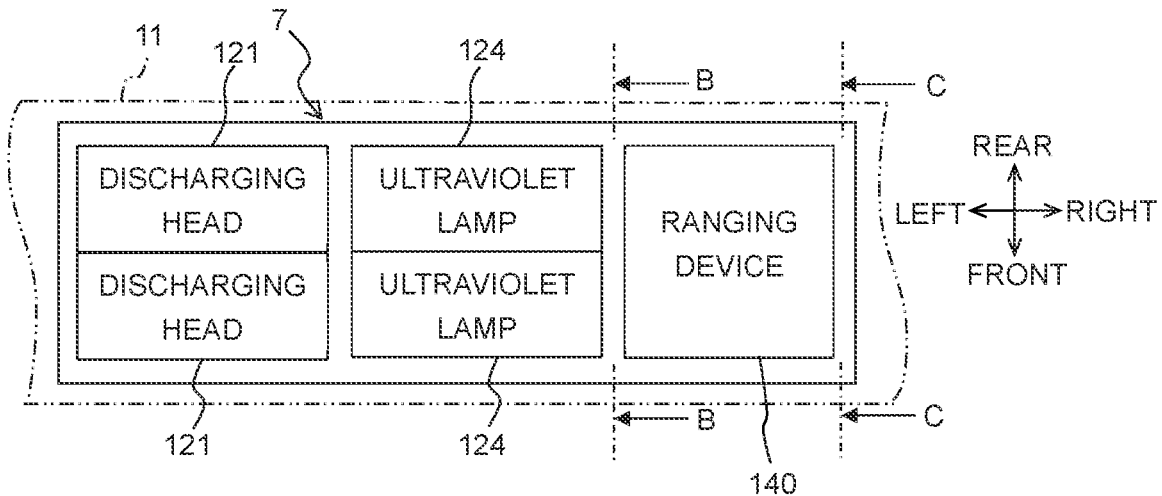
FIG. 3A is a schematic diagram depicting a configuration of a carriage in planar view.

Note that as depicted in FIG. 1, the image recording apparatus 1 according to this embodiment includes two discharging heads 121 (see FIG. 3A). One of the discharging heads 121 serves to discharge the ink of the four colors of CMYK (that is, cyan, magenta, yellow, and black), whereas the other discharging head 121 serves to discharge the ink of the colors of W (that is, white) and transparence. However, the number of discharging heads 121 is not limited to two but may be one or three or more.

The curing device 123 includes ultraviolet lamps 124 emitting ultraviolet rays as an example of curing light for curing the ink, and an irradiation driver 125 driving the ultraviolet lamps 124. Each of the ultraviolet lamps 124 has a plurality of light emitting diodes chips configured to emit the ultraviolet rays, and irradiates the ultraviolet rays toward the ink landed on the discharging object medium W. The irradiation driver 125 is made of an IC chip and the like to operate under a control signal from the controller 100 to drive the ultraviolet lamps 124. For example, each of the light emitting diode chips of the ultraviolet lamps 124 is not only switchable between turn-on and turn-off but also adjustable individually for its quantity of light when being turned on.

As depicted in FIG. 1, in the image recording apparatus 1 of this embodiment, the curing device 123 includes two ultraviolet lamps 124 (also see FIG. 3A). One ultraviolet lamp 124 corresponds to one discharging head 121 and is positioned at the side of the one discharging head 121 whereas the other ultraviolet lamp 124 corresponds to the other discharging head 121 and is positioned at the side of the other discharging head 121. However, the number of ultraviolet lamps 124 provided for all discharging heads 121 is not limited to two but may be one or may be three or more.

The scanning device 130 includes a carriage motor 131 which is an electric motor, and a motor driver 132 for driving the carriage motor 131. Further, the scanning device 130 includes, other than the above, a pulley connected to the rotary shaft of the carriage motor 131, an endless belt wound around the pulley and connected to the carriage 7, a guide rail supporting the carriage 7, and the like. Then, based on a control signal from the controller 100, if the motor driver 132 drives the carriage motor 131, then the pulley rotates such that the endless belt turns round, and consequently the carriage 7 reciprocates in the left/right direction along the guide rail.

The approaching/separating device (shifter) 133 includes an approaching/separating motor 134 which is an electric motor, and a motor driver 135 for driving the approaching/separating motor 134. Further, the approaching/separating device 133 includes, other than the above, a cam connected to the rotary shaft of the approaching/separating motor 134, a guide supporting the stage 6 for its upward and downward motion, and the like. Then, based on a control signal from the controller 100, if the motor driver 135 drives the approaching/separating motor 134, then the cam rotates such that the stage 6 moves upward and downward along the guide. As a result, the stage 6 serving as the support for the discharging object medium W moves in a direction approaching to the discharging heads 121 positioned above and in a direction separating from the discharging heads 121, and can maintain its position (height) at any point in its movable range.

The conveyance device 136 includes a conveyance motor 137 which is an electric motor, and a motor driver 138 for driving the conveyance motor 137. Further, the conveyance device 136 includes, other than the above, a rack connected to the tray 5, a pinion being engaged with the rack and connected to the rotary shaft of the conveyance motor 137, a rail guiding the tray 5, and the like. Then, based on a control signal from the controller 100, if the motor driver 138 drives the conveyance motor 137, then the rack and the pinion operate such that the tray 5 (and the stage 6) moves in the front/rear direction along the rail.

The ranging device (distance measurer) 140 is provided on the carriage 7. The ranging device is a sensor configured to measure the distance to the discharging object medium W arranged on the stage 6 positioned below the carriage 7 or the ranging device 140, in a case that the carriage 7 is moved and positioned above the stage 6. The ranging device 140 includes a first light emitter 141 configured to emit a ranging light for measuring the distance, and a first light receiver 142 configured to receive the ranging light reflected from the discharging object medium W. For example, the first light emitter 141 has a laser diode chip as the light emitting element, and the first light receiver 142 is constructed of a camera having an image sensor 142a and a lens 142b as the light receiving element (see FIG. 3C). Then, based on the control signal from the controller 100, if the first light emitter 141 emits the ranging light, then the ranging light is reflected by the discharging object medium W and the reflected light is received by the first light receiver 142. The controller 100 obtains the distance to the discharging object medium W on the basis of the result of the light receiving performed by the first light receiver 142. Such a distance measuring or ranging process according to the controller 100 is carried out by a ranging unit 101 realized by way of the controller 100 in operation according to the control program stored in the storage 110.

Here, in the image recording apparatus 1 according to this embodiment, the ranging light irradiated by the first light emitter 141 has the same wavelength as the curing light irradiated by the ultraviolet lamps 124 in the curing device 123. Further, the wavelength is a long one among ultraviolet rays. In particular, the wavelength is not less than 315 nm and less than 400 nm. However, the ranging light and the curing light are not limited to those wavelengths. A wavelength range of the ranging light and a wavelength range of the curing light may be different from each other. The wavelength range of the ranging light and the wavelength range of the curing light may be out of the range of not less than 315 nm and less than 400 nm.

Further, the camera constructing the first light receiver 142 has such a depth of field that a stage movable range from the nearest position of the stage 6 to the farthest position of the stage 6 is included in a focal distance of the camera. Here, the stage 6 moved by the approaching/separating device 133 is nearest to the discharging head 121 at the nearest position, and is farthest from the discharging head 121 at the farthest position. In this manner, it is desirable for the camera serving as the first light receiver 142 to have a depth of field which includes the stage movable range, and which is as wide as possible. However, the first light receiver 142 or the camera may have a depth of field including at least part of the stage movable range.

The medium detector 143 is provided in the vicinity of the front opening 2a in the casing 2. The medium detector 143 is a sensor configured to detect the discharging object medium W supported by the stage 6 and moving together with the tray 5 toward the front opening 2a. The medium detector 143 includes a second light emitter 144 configured to emit a detecting light and a second light receiver 145 configured to receive the detecting light. As depicted in FIG. 1, in this embodiment, the second light emitter 144 is provided at the left side of the front opening 2a while the second light receiver 145 is provided at the right side of the front opening 2a such that the second light emitter 144 and the second light receiver 145 are arranged to face each other. Further, the second light emitter 144 has for example a laser diode chip as the light emitting element, while the second light receiver 145 has for example a photo diode chip as the light receiving element.

Further, the detecting light emitted by the second light emitter 144 is set to has an optic axis passing the vicinity above the upper surface of the stage 6 moving in the front/rear direction with the tray 5 (about 1 mm above the upper surface of the stage 6, for example). Here, the optic axis of the detecting light is same as the optic axis of the second light emitter 144. Further, for the detecting light, it is preferable to select a light which has a high directionality, and which forms a constant diameter without substantial spreading in a path from the second light emitter 144 to the second light receiver 145.

The medium detector 143 of this kind emits the detecting light intermittently from the second light emitter 144 under the control signal from the controller 100. Then, if the discharging object medium W does not exist in a position blocking the optic axis of the detecting light, then the second light receiver 145 receives the detecting light. On the other hand, if the discharging object medium W exists in a position blocking the optic axis of the detecting light, then the second light receiver 145 is prevented from receiving the detecting light. In this manner, according to whether or not the second light receiver 145 receives the detecting light, it is detected whether or not the discharging object medium W exists in a predetermined position intersecting the optic axis of the detecting light.

Note that the medium detector 143 operates at the time of correcting the quantity of light of the ranging light to be irradiated from the first light emitter 141 of the distance measurer 140 to the discharging object medium W. Such a correction process is carried out by a corrector 102 realized by the controller 100 operating in accordance with the control program stored in the storage 110. The correction process will be described in detail later on in another section.

A shutter opening/closing device 150 is a mechanism configured to cover the light emitting area of the first light emitter 141 and the light receiving area of the first light receiver 142 of the ranging device 140 in a openable/closable manner. For example, the opening/closing device 150 is constructed from a shutter member 151 (see FIG. 3C), an actuator, and the like. Then, based on a control signal from the controller 100, the actuator actuates the shutter member 151 to switch between an opened state where the abovementioned light emitting area and the light receiving area are exposed, and a closed state where the abovementioned light emitting area and the light receiving area are blocked. The actuator can be constructed from, for example, an electric motor, a pulley, a belt, and the like. However, without being limited to that, the actuator can adopt other configurations. Note that in this embodiment, the shutter opening/closing device 150 is exemplified as to open and close both the light emitting area and the light receiving area (at the same time). However, without being limited to that, it is possible to adopt a configuration where the light emitting area and the light receiving area can be opened and closed independently from each other.

Further, the image recording apparatus 1 includes an interface 111. The image recording apparatus 1 can communicate with external devices via this interface 111. For example, the image recording apparatus 1 communicates with an external computer 200 such as a personal computer or the like and, based on image data received from the computer 200, prints images on the discharging object medium W.

The image recording apparatus 1 as described above carries out a printing process where the carriage 7 reciprocates in the left/right direction while the discharging heads 121 discharge the ink on predetermined timings and, further, the ultraviolet lamps 124 irradiate the ink landed on the discharging object medium W with ultraviolet rays. By virtue of this, the ink on the discharging object medium W is cured and images are formed (printed) on the discharging object medium W.

In the image recording apparatus 1, there is a comparatively long distance between the discharging heads 121 and the stage 6. Thus, the image recording apparatus 1 can also print images, by discharging the ink, on surfaces of the discharging object medium W in three dimension shapes having convexity and concavity in the height direction (such as protecting cases for smartphones, golf balls, and the like), without being limited to two dimension shapes such as paper and the like. On the other hand, in the case of printing on the discharging object medium W in such three dimension shapes, by correctly holding height information of the printing surfaces of the discharging object medium W and carrying out adjustments based on the height information, it is possible to facilitate high quality of the images. For example, based on the height information, it is conceivable to adjust the ink discharge timings and/or adjust the position of the stage 6 in height according to the convexity and concavity of the discharging object medium W. The image recording apparatus 1 of this embodiment includes the aforementioned ranging device 140 having the first light emitter 141 and the first light receiver 142 for obtaining the height information.

Here, in order for the ranging device 140 to realize correct measurements, it is necessary that the first light receiver 142 can further correctly detect the ranging light emitted by the first light emitter 141 and reflected from the discharging object medium W. However, if light comes into the casing 2 from the outside and, especially, if visible light comes in from the window 11 provided in the upper cover 10 of the casing 2 and then enters the first light receiver 142, then it is conceivable that the visible light acts as a disturbance to affect the detecting precision of the ranging device 140. Further, it is also desired to prevent the ultraviolet rays irradiated from the ultraviolet lamps 124 for curing the ink from leaking out from the window 11.

Therefore, the image recording apparatus 1 of this embodiment includes a configuration to control the light in the casing 2 by using a filter and the like. This configuration will be explained below.

<Filter and the Like>

As depicted in FIG. 3A, the carriage 7 according to this embodiment includes two discharging heads 121, two ultraviolet lamps 124, and one set of ranging device 140. On the carriage 7, the two discharging heads 121 are arranged to align in the front/rear direction, the two ultraviolet lamps 124 are also arranged in the front/rear direction. The front ultraviolet lamp 124 is positioned on the right side of the front discharging head 121 corresponding to the front discharging head 121 while the rear ultraviolet lamp 124 is positioned on the right side of the rear discharging head 121 corresponding to the rear discharging head 121. The ranging device 140 is sized to be elongate in the front/rear direction and arranged on the right side of the two ultraviolet lamps 124.

Further, as depicted in FIG. 1, the window 11 provided in the upper cover 10 of the casing 2 is elongate in the left/right direction and, as depicted in FIG. 3A, positioned above the carriage 7 as observed in planar view. Accordingly, visible light can come into the casing 2 from the window 11. Note that FIG. 3A depicts an example of arranging the window 11 to overlap with the entire of the carriage 7. However, without being limited to that, the window 11 may be arranged off centered (shifted) to the front or the rear of the carriage 7. More generally speaking, the window 11 can be defined as a member to form the incoming path for visible light which can reach to the first light receiver 142 of the ranging device 140.

Figure 3B:
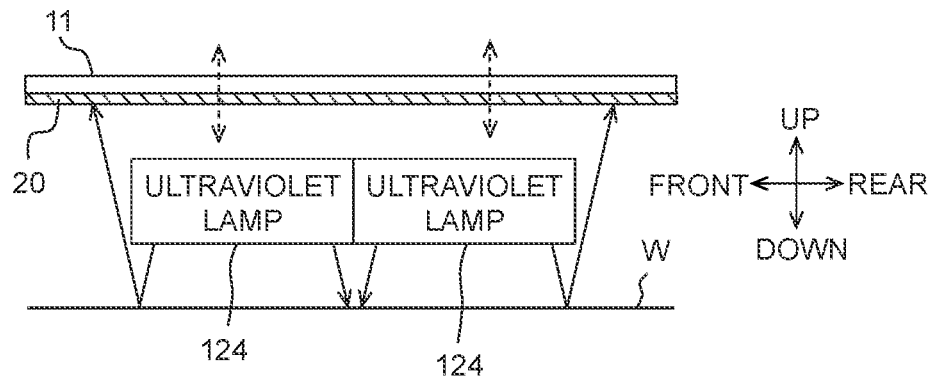
FIG. 3B is a schematic diagram for explaining a first filter.

As depicted in FIG. 3B, a first filter 20 is provided on the lower surface of the window 11. More specifically, the window 11 is constructed of a plate member made of a transparent material such as resin or the like, and the sheet-like first filter 20 is attached to the lower surface of the window 11 (the plate member). The first filter 20 has a function of selectively transmitting light. In particular, the first filter 20 has a function of restraining the transmission of the curing light more compared to the transmission of the visible light (that is, a transmission restraint ability of the first filter with respect to the curing light is higher than a transmission restraint ability of the first filter with respect to a visible light). Therefore, although it is possible to visually perceive the inside of the casing 2 from the outside through the window 11, the curing light emitted from the ultraviolet lamps 124 is restrained from leaking out through the window 11. Note that FIG. 3B depicts the visible light with the arrows in broken lines and depicts the curing light with the arrows in solid lines. Further, it is possible to construct such first filter 20 using a publicly known optical filter having the above explained function. Further, the first filter 20 is not limited to the configuration depicted in FIG. 3B. For example, the first filter 20 may be provided on the upper surface of the window 11, may be provided to cover part or the entire of the window 11, and/or may be constructed to be attachable to and removable from the window 11.

Figure 3C:
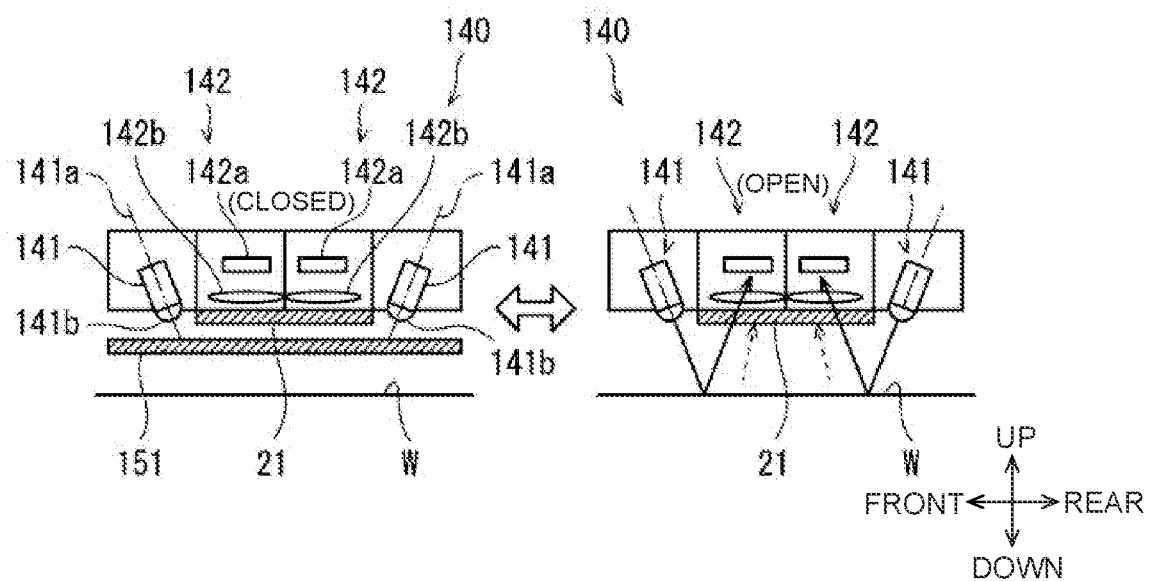
FIG. 3C is a schematic diagram for explaining a second filter and a shutter.

As depicted in FIG. 3C, the ranging device 140 has a configuration in which two first light receivers 142 aligned in the front/rear direction are positioned between two first light emitters 141 positioned along the front/rear direction at an interval. The two first light emitters 141 each have a light emitting element 141b having an optic axis 141a. Two optic axes 141a of the two first light emitters 141 each have a part or component facing to each other. That is, the two first light emitters 141 have the optic axes 141a approaching each other in following the light emitting direction. In other words, the optic axes 141a of the light emitting elements 141b are tilted such that the ranging lights emitted from the light emitting elements 141b approach to each other. By virtue of this, the ranging light is irradiated to the discharging object medium W without either frontward or rearward bias and the shadows on the discharging object medium W can be made evenly between the front and the rear. Therefore, it is possible to facilitate improvement of the precision of measuring distance by way of the triangulation method described below.

The two first light receivers 142 in the center part each have an image sensor 142a and a lens 142b. The ranging light emitted from the first light emitters 141 is reflected on the discharging object medium W and then comes into the image sensors 142a through the lenses 142b. Further, the first light receivers 142 are provided with a second filter 21. The second filter 21 has a function of selectively transmitting light. In particular, the second filter 21 has a function of restraining the transmission of the visible light more compared to the transmission of the ranging light (that is, a transmission restraint ability of the second filter with respect to the visible light is higher than a transmission restraint ability of the second filter with respect to a ranging light). Therefore, as depicted in the right drawing of FIG. 3C, the ranging light emitted from the first light emitters 141 comes into the first light receivers 142 after transmission through the second filter 21 whereas the visible light came into the casing 2 through the window 11, for example, is restrained from transmission through the second filter 21. Therefore, it is possible to prevent decrease of the ranging precision due to the entry of the visible light. Note that FIG. 3C depicts the visible light with the arrows in broken lines and depicts the ranging light with the arrows in solid lines. Further, it is possible to construct such second filter 21 using a publicly known optical filter having the above explained function.

Further, as depicted in the left drawing of FIG. 3C, the image recording apparatus 1 includes the shutter member 151. The shutter member 151 is a component of the shutter opening/closing device 150 described earlier on, and is configured to be opened and closed by the actuator which is driven on the basis of the control signal from the controller 100. In particular, if the shutter member 151 is closed, then as depicted in the left drawing of FIG. 3C, the shutter member 151 blocks the light emitting areas of the first light emitters 141 and the light receiving areas of the first light receivers 142 whereas if the shutter member 151 is opened, then as depicted in the right drawing of FIG. 3C, the light emitting areas and the light receiving areas are exposed. Therefore, if the shutter member 151 is closed during a period in which the distance measuring process is not carried out, it is possible to prevent the first light emitters 141 and the first light receivers 142 from being contaminated by some tiny ink droplets (the ink mist) floating in the casing 2, even if such ink mist exists. Such ink mist can be caused by the portion of the ink having been discharged from the discharging head 121 and is remained in the casing 2.

<Other Configurations>

Figure 4:
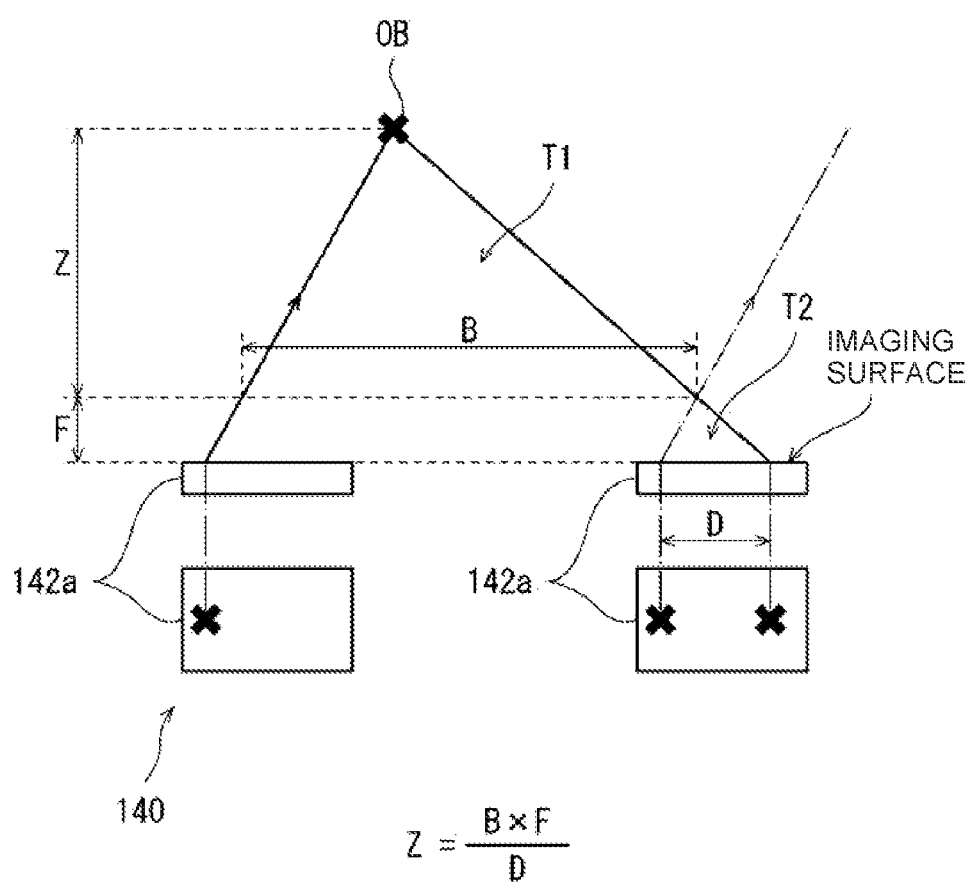
FIG. 4 is a schematic diagram for explaining a triangulation method.

FIG. 4 is a schematic diagram for explaining a ranging process performed by the ranging device 140 according to this embodiment. The ranging device 140 measures the distance to the discharging object medium W by using the so-called triangulation method on the basis of the image obtained by the two first light receivers 142 (cameras) owing to receiving of the light. To explain just the outline but omit the details because the method is publicly known, as depicted in FIG. 4, B refers to the distance between the respective image sensors 142a, F refers to the focal distance, Z refers to the distance to the object OB for measuring the distance, and D refers to the visual difference of the light coming into the respective image sensors 142a with respect to the object OB. On this occasion, the triangle T1 with B as the base and Z as the height and the triangle T2 with D as the base and F as the height are similar. Therefore, with the formula [Z=(B×F)/D] in the figure, it is possible to find the distance Z to the object OB.

Note that the configuration of the ranging device 140 and measuring method are not limited to those described above. For example, other methods may be adopted as far as the methods are applied to measure the distance based on the light received by a sensor. In such cases, it is possible to adopt any suitable configurations therefor.

Next, referring to FIG. 5, an explanation will be made on the correction process for correcting the quantity of light of the ranging light irradiated by the first light emitters 141 of the distance measurer 140 to the discharging object medium W. To begin with an outline for the explanation, the correction process includes the step of separating the discharging object medium W from the discharging head 121 by moving the discharging object medium W downwardly from a first state in which the discharging object medium W blocks the detecting light to a second state in which the discharging object medium W no longer blocks the detecting light; and the step of correcting a quantity of light of the ranging light to be emitted from the first light emitter 141 based on a quantity of light of the ranging light received by the first light receiver 142 in a case that the ranging light is emitted to the discharging object medium W of which position, in a moving direction (up/down direction) of the stage 6 by the approaching/separating device 133, is identical to a position of the discharging object medium W, in the moving direction of the stage 6 by the approaching/separating device 133, in the second state. The corrector 102 of the controller 100 carries out the correction process. Further, by carrying out the correction process before the distance measuring process, the distance measuring process can be carried out with an appropriate quantity of light such that it is possible to facilitate improvement of the distance measuring precision. A more specific explanation will be made below.

As depicted in FIG. 5, the image recording apparatus 1 causes the conveyance device 136 to convey the stage 6 rearward to the front opening 2a in a state that the discharging object medium W is supported by the stage 6 (a first step). On this occasion, the stage 6 is set at the upmost position, for example, within a range in which the stage 6 is ascendible and descendible. Then, the optic axis 144a of the detecting light from the second light emitter 144 of the medium detector 143 is positioned in the vicinity of the stage 6 and right above the stage 6. The detecting light along the optic axis 144a is received by the second light receiver 145 facing the second light emitter 144 during the first step.

If the stage 6 is moved rearward in the first step, then the discharging object medium W is approaching the optic axis 144a. Then, at some point of the timing, the discharging object medium W reaches the position intersecting the optic axis 144a. On this occasion, the detecting light from the second light emitter 144 is blocked by the discharging object medium W such that the second light receiver 145 cannot receive the detecting light. The controller 100 determines whether or not the switching from the detecting state to the non-detecting state has occurred in the second light receiver 145. If it determines that the switching has occurred, then the conveyer 136 stops the stage 6 from moving rearward (a second step).

Next, the image recording apparatus 1 causes the approaching/separating device 133 to lower the stage 6 with the discharging object medium W (a third step). In the third step, the second light receiver 145 is in the non-detecting state, and the third step is continued until the switching from the non-detecting state back to the detecting state. That is, in the third step, while the stage 6 is descending, the optic axis 144*a* of the detecting light is fixed in the position without change. Therefore, if the stage 6 is descending, then at some point of the timing, the discharging object medium W moves off the position intersecting the optic axis 144*a* such that the second light receiver 145 returns to the state where the second light receiver 145 can detect the detecting light.

The controller 100 determines whether or not the switching from the non-detecting state to the detecting state has occurred in the second light receiver 145. If it determines that the switching has occurred, then the controller 100 cause the approaching/separating device 133 to stop the stage 6 from moving downward (a fourth step). As a result, the controller 100 obtains the height information of a predetermined point (or part) of the discharging object medium W from the conveyance position and the descent position of the stage 6. Then, the predetermined point of the discharging object medium W is moved to the position opposed to the ranging device 140, keeping the height of the predetermined point, and at that position the quantity of light of the ranging light is corrected.

That is, the ranging light is emitted from the first light emitters 141 at a predetermined quantity of light and, on that occasion, based on the quantity of light of the ranging light received by the first light receivers 142, the quantity of light of the ranging light to be emitted from the first light emitters 141 is corrected. More specifically, a comparison is made between the height information obtained through the first to the fourth steps, and the distance information measured by the ranging device 140 by emitting the ranging light from the first light emitters 141 to the predetermined point on the medium W as the target. Such comparison is carried out while gradually changing the quantity of light of the ranging light emitted from the first light emitters 141. Then, the quantity of light of the ranging light emitted from the first light emitters 141 when the difference value between the height information and the distance information reaches not more than a predetermined threshold value is selected. And then, the quantity of light of the ranging light to be emitted from the first light emitters 141 for performing distance measurement for the medium W is corrected to the selected quantity of light.

By virtue of this, the first light emitters 141 can be corrected based on the height information of the discharging object medium W which is the actual object for printing the images, and thus, it is possible to realize a more accurate distance measuring process. Further, the environment for placing the image recording apparatus 1 may affect the light receiving at the first light receivers 142. Therefore, by carrying out the correction according to the change in the placing environment, it is possible to carry out a more accurate distance measuring process. Note that the correction method described above is merely an example, and other correction methods may be adopted as well without being limited to the former.

Further, the above description shows an example of obtaining the height information of the discharging object medium W and, based on that height information, the correcting process is carried out. However, height information other than that of the discharging object medium W may be used. For example, as depicted in FIG. 1, the image recording apparatus 1 according to this embodiment is provided with a reference (correcting member) 30 in a predetermined place of the stage 6. The reference 30 is a block-shaped cuboid, for example, and its upper surface is a plane (flat surface) parallel to the stage 6. Then, the height information of the upper surface of the reference 30 is stored beforehand in the ROM or the like of the controller 100. The quantity of light may be corrected on the basis of the quantity of light of the received ranging light when such reference 30 is irradiated with the ranging light.

As explained in the above, in the image recording apparatus 1 according to this embodiment, the first filter 20 having a function of restraining the transmission of the curing light more compared to the transmission of the visible light is provided on the window 11, and the second filter 21 having a function of restraining the transmission of the visible light more compared to the transmission of the ranging light is provided on the first light receivers 142. By virtue of this, it is possible to prevent the curing light (typically the ultraviolet rays) from the curing device 123 from leaking out from the window 11 while allowing for visual perception of the inside of the casing 2 through the window 11. In addition, it is possible to prevent the visible light came into the casing 2 via the window 11 from entering the first light receivers 142, thereby preventing the distance measuring from decrease in precision.

As described above, in the image recording apparatus 1, the wavelength of the ranging light and the wavelength of the curing light are identical to each other. By virtue of this, it is possible to prevent not only the curing light but also the ranging light from leaking out from the window 11. Further, as the ranging light, the light having a long wavelength among the ultraviolet rays, in particular, the light having the wavelength of not less than 315 nm and less than 400 nm is adopted. By virtue of this, because small convexity and concavity on the surfaces of the discharging object medium W can be detected easily. Thus, it is possible to obtain more accurate height information, and consequently it is possible to facilitate further high quality of the images.

It is possible to apply the present disclosure to image recording apparatuses.

What is claimed is:
1. An image recording apparatus comprising:
a head configured to discharge a photo-curing liquid to a medium,
an irradiator configured to irradiate a curing light to cure the photo-curing liquid;
a distance measurer including a first light emitter configured to emit a ranging light to measure a distance to the medium, and a first light receiver configured to receive the ranging light; and
a casing housing the head, the irradiator and the distance measurer, and having a window through which an inside of the casing is visually perceptible,
wherein a first filter is provided on the window, the first filter having a function of restraining transmission of the curing light more compared to transmission of a visible light, and
a second filter is provided on the first light receiver, the second filter having a function of restraining transmission of the visible light more compared to transmission of the ranging light.
2. The image recording apparatus according to claim 1, wherein a wavelength of the ranging light to be emitted from the first light emitter and a wavelength of the curing light to be irradiated from the irradiator are identical to each other.

3. The image recording apparatus according to claim 1, wherein a wavelength of the ranging light to be emitted from the first light emitter is not less than 315 nm and less than 400 nm.

4. The image recording apparatus according to claim 1, further comprising a shutter configured to cover a light emitting area of the first light emitter, in an openable and closeable manner.

5. The image recording apparatus according to claim 1, further comprising a shutter configured to cover a light receiving area of the first light receiver, in an openable and closeable manner.

6. The image recording apparatus according to claim 1, further comprising:
 a support configured to support the medium, and
 a shifter configured to move the support in a direction approaching the head and in a direction separating from the head,
 wherein the first light receiver includes one or more cameras each having such a depth of field that a range from a first position of the support to a second position of the support is included in a focal distance of the camera, the support moved by the shifter is nearest to the head at the first position and farthest from the head at the second position.

7. The image recording apparatus according to claim 6, further comprising a controller, wherein
 the one or more cameras of the first light receiver is a plurality of cameras, and
 the controller is configured to measure the distance to the medium by using a triangulation method based on an image obtained by the plurality of cameras owing to the receiving of the ranging light.

8. The image recording apparatus according to claim 6, further comprising:
 a medium detector including a second light emitter configured to emit a detecting light, and a second light receiver configured to receive the detecting light emitted by the second light emitter, an optic axis of the detecting light passing through a position above the support; and
 a controller,
 wherein the controller is configured to:
 separate the medium from the head by the shifter from a first state in which the medium blocks the detection light on the optic axis to a second state in which the medium no longer blocks the detection light on the optic axis; and then
 correct a quantity of light of the ranging light to be emitted from the first light emitter based on a quantity of light of the ranging light received by the first light receiver in a case that the ranging light is emitted to the medium of which position, in a moving direction of the support by the shifter, is identical to a position of the medium, in the moving direction of the support by the shifter, in the second state.

9. The image recording apparatus according to claim 1, wherein the first light emitter includes a plurality of light emitting elements, a plurality of optic axes of the plurality of light emitting elements being tilted such that the ranging lights emitted from the plurality of light emitting elements approach to each other.

10. The image recording apparatus according to claim 1, further comprising:
 a support configured to support the medium; and
 a controller,
 wherein the support is provided with a reference used for correcting the quantity of light of the ranging light, and
 the controller is configured to correct the quantity of light of the ranging light to be emitted from the first light emitter based on a quantity of light of the ranging light received by the first light receiver, in a case that the ranging light is emitted to the reference.

* * * * *